United States Patent [19]

Ernst

[11] Patent Number: 4,549,356
[45] Date of Patent: Oct. 29, 1985

[54] SEALING ARRANGEMENT FOR MULTICOORDINATE SENSING HEAD

[75] Inventor: Alfons Ernst, Traunreut, Fed. Rep. of Germany

[73] Assignee: Johannes Heidenhain GmbH, Traunreut, Fed. Rep. of Germany

[21] Appl. No.: 690,830

[22] Filed: Jan. 11, 1985

Related U.S. Application Data

[63] Continuation of Ser. No. 522,403, Aug. 11, 1983, abandoned.

[30] Foreign Application Priority Data

Aug. 21, 1982 [DE] Fed. Rep. of Germany ....... 3231159

[51] Int. Cl.[4] ................................................. G01B 7/28
[52] U.S. Cl. ..................................... 33/169 R; 33/559;
33/556
[58] Field of Search ............. 33/169 R, 174 L, 172 E,
33/180, 23 K; 409/26; 251/3

[56] References Cited

U.S. PATENT DOCUMENTS

| 3,235,222 | 2/1966 | Nickell | 251/3 |
| 3,660,906 | 5/1972 | Zimmermann | 33/174 L |
| 4,229,010 | 10/1980 | Laurent | 74/18.1 X |

FOREIGN PATENT DOCUMENTS

| 2347633 | 3/1979 | Fed. Rep. of Germany . | |
| 2814579 | 10/1979 | Fed. Rep. of Germany | 409/126 |
| 3031770 | 3/1981 | Fed. Rep. of Germany . | |
| 741414 | 12/1955 | United Kingdom | 251/3 |
| 1237813 | 6/1971 | United Kingdom . | |
| 1599758 | 10/1981 | United Kingdom . | |

Primary Examiner—Harry N. Haroian
Attorney, Agent, or Firm—Willian Brinks Olds Hofer Gilson & Lione Ltd.

[57] ABSTRACT

A multicoordinate sensing head includes a housing which defines a sensing pin opening which is covered by a rigid plate. The plate defines at its center a cup bearing which pivotably mounts a ball. The ball defines a diametrically oriented bore sized to slide over a sensing pin. The plate is mounted to slide radially with respect to the housing in a circular recess defined by the housing. The outside diameter of the plate and the dimensions of the recess are matched in such a way that the sensing pin is free to move laterally when tilted. During such tilting the ball surrounding the sensing pin pivots in its bearing and the sensing pin opening remains covered in all cases.

5 Claims, 1 Drawing Figure

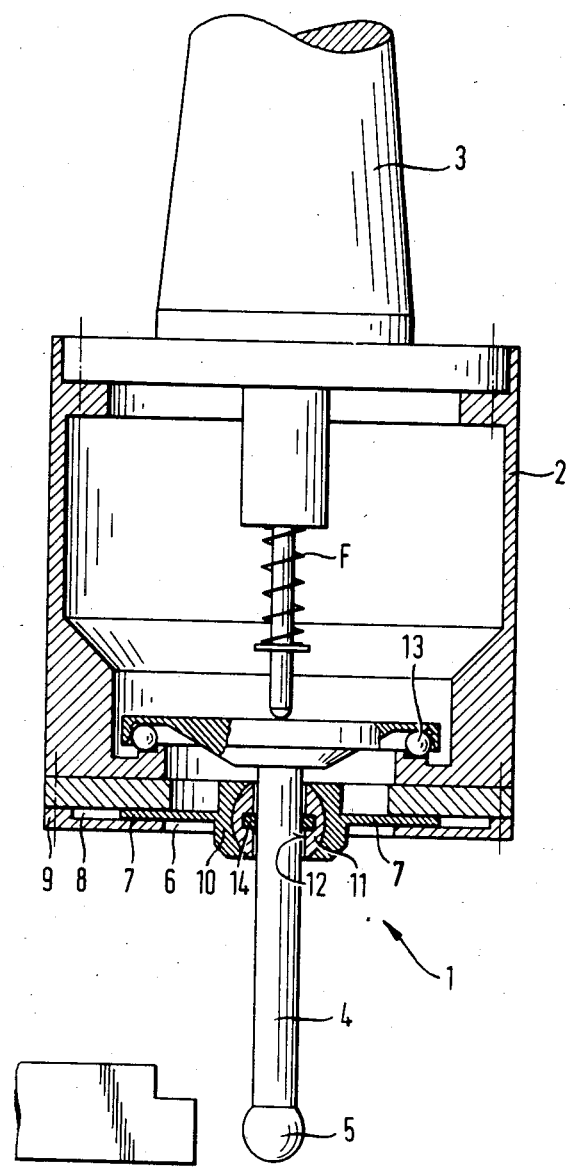

SEALING ARRANGEMENT FOR MULTICOORDINATE SENSING HEAD

This application is a continuation of application Ser. No. 522,403 filed Aug. 11, 1983, now abandoned.

BACKGROUND OF THE INVENTION

The present invention relates to a sealing arrangement for a multicoordinate sensing head of the type which includes a housing which defines an opening, and a sensing pin which defines an axial direction and includes a free end which extends out of the housing through the opening.

A wide variety of such multicoordinate sensing heads are disclosed in a number of publications. In large part, these publications are directed to mechanical details which relate to the construction of the multicoordinate sensing heads.

Thus, for example, German DE-OS No. 3 031 770, German patent DE-PS No. 23 47 633, British Pat. No. 1,237,813 and British Pat. No. 1,599,758 disclose sensing heads in which the opening at the bottom of the sensing head housing through which the sensing pin passes is covered by an elastic seal which takes the form of a folded bellows. This bellows is fastened at its outer edge to the sensing head casing, and at its inner edge to the sensing pin in order to cover the opening between the pin and the housing while accommodating angular movement of the sensing pin with respect to the housing. Typically, such bellows are made of rubber or of an elastomeric synthetic material in order to prevent the penetration of dust and moisture into the interior of the sensing head housing.

Such bellows seals are adequate in operation as long as the sensing heads are used in a benign environment such as that of a typical coordinate measuring machine. To an increasing degree, however, sensing heads are used on numerically controlled processing machines, and thus must operate in a much harsher environment which may, for example, include shavings or cuttings, cooling fluid and cutting oils. Bellows of the accordion type are in many cases unsuitable for use in such harsh environments since hot shavings or chips can damage or even destroy elastomeric accordion bellows.

SUMMARY OF THE INVENTION

The present invention is directed to an improved sealing arrangement for a sensing head which to a large extent overcomes the disadvantages described above of accordion type bellows. The sealing arrangement of this invention operates to cover the sensing pin opening in the sensing head housing in a manner which is resistant to hot shavings and is therefore suitable for use in harsh environments, yet which nevertheless accommodates large sensing pin deflections.

According to this invention, a multicoordinate sensing head of the type described initially above is provided with a plate mounted to the housing such that the plate is movable with respect to the housing in a low friction manner in radial directions transverse to the axial direction. A ball is mounted to the sensing pin such that the pin is movable with respect to the ball in a low friction manner along the axial direction, and means are provided for mounting the ball to the plate such that the ball is free to pivot in the plate. The pin, plate, ball and mounting means all cooperate to cover the opening in order substantially to prevent contaminants from entering the housing while accommodating low friction movement of the pin with respect to the housing.

A key advantage of this invention is that it can be used to seal an opening around the sensing pin with a plate that is substantially heat-proof and moisture-proof, yet which accommodates deflection of the sensing pin in all directions.

The invention itself, together with further objects and attendant advantages, will best be understood by reference to the following detailed description, taken in conjunction with the accompanying drawing.

BRIEF DESCRIPTION OF THE DRAWING

FIG. 1 is a cross-sectional view of a sensing head which incorporates the presently preferred embodiment of the sealing arrangement of this invention.

BRIEF DESCRIPTION OF THE PRESENTLY PREFERRED EMBODIMENTS

Turning now to the drawings, FIG. 1 illustrates a cross-sectional view of a sensing head 1 which includes a sensing head housing 2. This housing 2 can be mounted by means of a receiving mandrel 3 in the spindle of a measuring or processing machine (not shown). A sensing pin 4 is provided which is deflectable in several directions against the restoring force of a spring F. The sensing pin 4 is mounted in the interior of the sensing head housing 2 in such a way that the free end 5 of the pin 4 is automatically positioned to a precisely defined zero or rest position.

In the bottom of the sensing head housing 2 there is present an opening through which the sensing pin 4 projects from the housing 2 and which therefore is designated as the sensing pin opening 6. It should be understood that the sensing head 1 shown in FIG. 1 is rotationally symmetrical, and that any sectional view taken through the center of the sensing head 1 would correspond to FIG. 1.

In order to seal off the interior of the sensing head 1 in a secure manner against harmful contaminants, the sensing pin opening 6 is provided with a plate 7. This plate 7 is mounted in place on the housing 2 by an annular recess 8 which captures the outer perimeter of the plate 7. The recess 8 is defined at the bottom of the housing 2 and takes the form of a circular ring with a small cross-sectional dimension parallel to the length of the pin 4. The recess 8 is bounded at its outer circumference by lugs 9 which in effect define a rim. The inner circumference of the recess 8 is in communication with the sensing pin opening 6. The plate 7 is mounted in the annular gap defined by the recess 8 such that the plate 7 is movable with low friction in radial directions transverse to the axial direction defined by the pin 7. The play between the flat circular plate 7 and the recess 8 is small such that the plate 7 is substantially confined to radial movements with respect to the housing 2. The plate 7 is provided with a circular outer perimeter and is sized such that the outer perimeter of the plate 7 contacts the lugs 9 bounding the recess 8 in order to define a stop which limits the maximally admissible deflection of the sensing pin 4 with respect to the housing 2. The plate 7 defines at its center a cup bearing 10 which is a spherically shaped opening sized to receive a ball 11. This ball 11 defines a diametrically oriented bore 12 which is sized to fit over the sensing pin 4 such that the sensing pin 4 is slidable in the bore 12 in a low friction manner along the axial direction. However, the bore 12 corresponds closely to the diameter of the sensing pin 4 in order to minimize play or skewing between the pin 4 and the bore 12.

On axial deflection of the sensing pin 4, the sensing pin 4 slides axially upwardly in the bore 12 and engages a position measuring system (shown in general outline only).

The sensing pin 4 is mounted to the housing 2 by means of a bearing assembly 13 disposed in the interior of the housing 2. When the sensing pin 4 is tilted away from the axial direction shown in FIG. 1, the bearing assembly 13 allows the sensing pin 4 to tilt with respect to the housing 2 such that the sensing pin encloses an angle with respect to the central axis determined by the mandrel 3. Such a tilting of the sensing pin 4 is converted by the bearing assembly 13 to axial movement of the position measuring system. Thus, the position measuring system generates a deflection signal in response to tilting of the sensing pin 4. Preferably, the position measuring system is sufficiently accurate such that deflection signals are generated in the event the sensing pin is deflected by as little as 10 microns.

The slight play in the gap between the sensing pin 4 and the bore 12 permits the use of an elastic seal 14 which operates to seal the slight gap between the sensing pin 4 and the bore 12. This gap, which is typically on the order of magnitude of between 20 microns and 100 microns in width, is large enough to ensure that the deflection signal is triggered accurately. However, this gap is small enough to protect the interior of the housing 2 from hot shavings, chips or the like, which could destroy the elastic seal 14. Thus, the small gap needed to allow low friction movement of the sealing arrangement can if need be sealed off by a seal such as the elastic seal 14 while still avoiding the disadvantages of the prior art bellows type seals described above.

When the sensing pin is deflected to a greater extent (which for reasons of safety must be accommodated) the following sequence of events takes place: the ball 11 surrounding the sensing pin 4 pivots in the cup bearing 10, and because of the tilting of the sensing pin 4 about a point in the bearing 13, the sensing pin 4 moves radially outwardly by a small amount. In order to accommodate this radial movement, the cup bearing 10 which supports the ball 11 moves with the sensing pin 4 in the radial direction, and the plate 7 is therefore shifted in the radial direction in the recess 8. Thus, deflection of the sensing pin 4 in a direction which deviates from the axial direction necessarily results in a displacement of the plate 7 in the radial direction. The position measuring system (which is not shown in detail) is, however, always acted upon axially, regardless of the direction in which the sensing pin 4 is deflected.

The position measuring system delivers a deflection signal in a known manner in response to any sensing pin deflection, which signal can be evaluated in a manner well known to those skilled in the art.

The maximum possible deflection of the sensing pin 4 is determined by the diameter of the plate 7 and the inside diameter of the recess 8.

The maximum possible sensing pin deflection can be further increased as shown in FIG. 2 by mounting the bottom portion of the housing 2 which defines the recess 8 to the remainder of the housing 2 in a manner such that the bottom portion of the housing is shiftable radially against a restoring force in the manner of a slide block guide.

In view of the foregoing description, it should be apparent that a seal for a sensing head has been disclosed which includes a plate 7 which is radially movable with respect to the housing 2, which plate 7 defines a cup bearing 10 that pivotably supports a ball 11. This ball 11 serves to receive the sensing pin 4 in an axially movable manner. The entire arrangement provides a sturdy sealing arrangement for the sensing head housing 2 which is substantially insensitive to harsh environments and which can even withstand hot chips and shavings from a milling or cutting operation.

Of course, it should be understood that a wide range of changes and modifications to the preferred embodiments described above will be apparent to those skilled in the art. It is, therefore, intended that the foregoing detailed description be regarded as illustrative rather than limiting, and that it be understood that it is the following claims, including all equivalents, which are intended to define the scope of this invention.

I claim:

1. In a multicoordinate sensing head comprising a housing which defines an opening, a sensing pin which defines an axial direction and includes a free end which extends out of the opening, and means for tiltably mounting the sensing pin to the housing, an improved sealing arrangement comprising:
   a plate mounted to the housing such that the plate is movable with respect to the housing in a low friction manner in radial directions transverse to the axial direction and the plate is separated from the mounting means along the axial direction;
   a ball slideably mounted to the pin such that the pin is movable with respect to the ball in a low friction manner along the axial direction; and
   means for mounting the ball to the plate such that the ball is free to pivot in the plate;
   said pin, plate, ball, and mounting means cooperating to cover the opening to substantially prevent contaminants from entering the housing while accommodating low friction movement of the pin with respect to the housing, said movement comprising both axial sliding of the sensing pin with respect to the ball and the plate and angular pivoting of the sensing pin and the ball with respect to the mounting means and the plate.

2. The invention of claim 1 wherein the housing comprises:
   means for defining a recess around the opening sized and positioned to receive the plate to mount the plate to the housing; and
   an annular rim disposed at the radially outer perimeter of the recess to limit radial movement of the plate.

3. The invention of claim 1 further comprising:
   an elastic seal disposed between the ball and the pin.

4. In a multicoordinate sensing head comprising a housing which defines an opening, and a sensing pin which defines an axial direction and includes a free end which extends out of the opening, the improvement comprising:
   means for defining an annular, planar recess in the housing adjacent the opening, said recess being bounded at its radially outer edge by a rim;
   a flat plate which defines a central spherically shaped opening and a perimeter disposed in the annular recess such that the plate is freely slidable with respect to the housing in the plane of the recess and movement of the plate in the recess is bounded by the rim;

a ball which defines a diametrically oriented bore sized to receive the pin, said ball disposed in the opening of the plate such that the ball is freely pivotable in the opening with respect to the plate;

a resilient seal disposed in the bore between the ball and the pin in order to create a seal between the ball and the pin while accommodating free movement in the axial direction of the pin with respect to the ball;

said recess, plate, ball and seal cooperating with the pin to seal the opening without interferining with axial sliding of the pin with respect to the ball, plate and housing or tilting movement of the pin and the ball with respect to the plate and the housing.

5. The invention of claim 1 wherein the ball defines a bore which is larger than the pin to create an annular gap between the ball and the pin, and wherein the invention further comprises an elastomeric sealing element disposed in the bore to seal the bore against contaminants.

* * * * *